United States Patent
Kim

(10) Patent No.: US 10,549,583 B2
(45) Date of Patent: Feb. 4, 2020

(54) TUBELESS TIRE HAVING REINFORCED BEAD PORTION

(71) Applicant: HANKOOK TIRE CO., LTD., Seoul (KR)

(72) Inventor: Jong Guk Kim, Daejeon (KR)

(73) Assignee: HANKOOK TIRE CO., LTD., Seoul (KR)

(*) Notice: Subject to any disclaimer, the term of this patent is extended or adjusted under 35 U.S.C. 154(b) by 145 days.

(21) Appl. No.: 15/483,558

(22) Filed: Apr. 10, 2017

(65) Prior Publication Data

US 2017/0291458 A1    Oct. 12, 2017

(30) Foreign Application Priority Data

Apr. 12, 2016  (KR) .................. 10-2016-0044823

(51) Int. Cl.
*B60C 15/06*    (2006.01)

(52) U.S. Cl.
CPC .. *B60C 15/0628* (2013.01); *B60C 2015/0614* (2013.01); *B60C 2015/0678* (2013.01)

(58) Field of Classification Search
CPC ..... B60C 15/00; B60C 15/06; B60C 15/0603; B60C 15/0607; B60C 15/0628; B60C 15/0632
See application file for complete search history.

(56) References Cited

U.S. PATENT DOCUMENTS

| 4,265,292 A * | 5/1981 | Inoue | B60C 15/0027 |
| | | | 152/543 |
| 5,131,447 A * | 7/1992 | Nakagawa | B60C 15/06 |
| | | | 152/543 |
| 2006/0196591 A1 | 9/2006 | Yoshikawa et al. | |

(Continued)

FOREIGN PATENT DOCUMENTS

| EP | 247422 | * 12/1987 |
| EP | 0251145 A2 | 1/1988 |
| EP | 2184186 | * 5/2010 |

(Continued)

OTHER PUBLICATIONS

Machine translation of JP 2011-255858, 2011.*

(Continued)

*Primary Examiner* — Justin R Fischer
(74) *Attorney, Agent, or Firm* — Marshall, Gerstein & Borun LLP

(57) ABSTRACT

Disclosed is a tubeless tire having a reinforced bead portion capable of reducing the stress applied to a portion contacting a rim flange and to an edge of a carcass. The tubeless tire includes a carcass turned up around a bead core, a bead filler filled in a space above the bead core surrounded by the carcass, a steel chafer disposed to contact an outer surface of the carcass, and a first reinforcing rubber layer provided between the bead core and the carcass in order to prevent a turnup portion of the carcass from being pulled downwards, the first reinforcing rubber layer being located around a (Continued)

portion of the bead core that is oriented toward a rim flange. The bead portion is improved in durability under a high-pneumatic-pressure condition by reducing the stress applied to interfaces of the edge of the carcass, the steel chafer and the nylon chafer.

3 Claims, 3 Drawing Sheets

(56) References Cited

U.S. PATENT DOCUMENTS

2016/0082786 A1    3/2016    Izuhara

FOREIGN PATENT DOCUMENTS

| JP | S632708 A | | 1/1988 |
|---|---|---|---|
| JP | H0350004 A | | 3/1991 |
| JP | H06-297919 A | | 10/1994 |
| JP | H10-147116 A | | 6/1998 |
| JP | 2000-62416 | * | 2/2000 |
| JP | 2003-237324 | * | 8/2003 |
| JP | 3646199 B2 | | 5/2005 |
| JP | 2007-76549 A | | 3/2007 |
| JP | 2009101943 A | | 5/2009 |
| JP | 2011-255858 | * | 12/2011 |
| JP | 2012-171399 | * | 9/2012 |
| JP | 2015-155150 A | | 8/2015 |
| JP | 2017114454 A | | 6/2017 |

OTHER PUBLICATIONS

Office Action issued in Japanese Patent Application No. 2017-068414 dated Mar. 2, 2018.
Extended European Search Report issued in European Pat. Appl. No. 17163770.5, dated Aug. 2, 2017.
Office Action issued in Korean Patent Application No. 10-2016-0044823 dated Jan. 18, 2017.
Office Action issued in European Patent Application No. 17163770 dated Sep. 27, 2018.
Office Action issued in Japanese Patent Application No. 2017-068415 dated Nov. 2, 2018.
Office Action issued in Chinese Patent Application No. 201710231959 dated Nov. 20, 2018.

* cited by examiner

TUBELESS TIRE HAVING REINFORCED BEAD PORTION

TECHNOLOGICAL FIELD

The present disclosure relates to a tubeless tire, and more particularly to a tubeless tire having a reinforced bead portion, which is capable of effectively reducing the stress applied to a portion contacting a rim flange portion and to an edge portion of a carcass.

BACKGROUND

In general, the durability of a tire is determined by the durability of a belt and the durability of a bead. Much research for preventing separation of a bead portion of a tire has been conducted.

FIG. 1 is a sectional view illustrating a conventional bead portion 10 of a tire for preventing separation of the bead portion. As shown in the drawing, a carcass 12, which forms the basic frame of a tire, is arranged in the radial direction around a bead bundle 11, which is embodied as a high-strength steel wire. If a tire rolls in an overloaded or high-temperature state for a long time, high shearing stress is applied to a turnup edge portion 12a of the carcass 12 due to repeated compression and extension, which results in separation of the bead portion.

A typical reinforcement structure for preventing this problem functions to protect the carcass 12 using a steel chafer 14, which is embodied as a steel cord, and, if necessary, further using a nylon chafer 15. Further, in the conventional structure, in which the carcass 12 is disposed around the bead core 11, an empty space is filled with rubber, which is referred to as a bead filler 13. In the case of a large tire, in order to meet requirements thereof, a bead filler 13 is designed as two rubber members having different properties from each other. The rubber member located at a high position is referred to as an upper bead filler 13a, and the rubber member located at a low position is referred to as a lower bead filler 13b.

Conventional structures of a bead portion of a tire are disclosed in Korean Patent Publication No. 2012-0067138, Korean Patent Publication No. 2013-0014878, and Korean Patent Publication No. 2013-0075792.

A tubeless tire is constructed such that an airtight rubber layer, which is formed of a butyl-based rubber, is directly adhered to the interior surface of the tire instead of a tube. Such a tubeless tire has an advantage in that air leakage is prevented, heat generation is low because there is no friction between a tube and a tire, the weight is reduced, and the assembly process is simple.

However, in the state in which a high pressure is applied to the tubeless tire, if heat is transferred to a rim flange portion from a brake drum or other components, the portion of the rubber that is in contact with the rim flange portion may be damaged. In order to prevent this problem, a conventional tire is manufactured such that the amount of rubber is increased so as to reduce the stress applied to the portion of the tire that is in contact with the rim flange portion. However, this manufacturing method is not so effective when cracks are formed in the steel chafer and the nylon chafer. Further, when cracks are formed in the edge portion of the carcass, the cracks spread along the interface of the steel chafer, and consequently a portion of the rubber that is in contact with the rim flange portion is easily cracked.

SUMMARY OF THE DISCLOSURE

Therefore, the present disclosure has been made in view of the above problems, and it is an object of the presently described embodiments to provide a tubeless tire having a reinforced bead portion, which improves durability by reducing the stress applied to interfaces of an edge portion of a carcass, a steel chafer and a nylon chafer.

In accordance with the presently described embodiments, the above and other objects can be accomplished by the provision of a tubeless tire having a reinforced bead portion including a carcass turned up around a bead core, a bead filler filled in a space above the bead core surrounded by the carcass, a steel chafer disposed to contact an outer surface of the carcass, and a first reinforcing rubber layer provided between the bead core and the carcass in order to prevent a turnup portion of the carcass from being pulled downwards, the first reinforcing rubber layer being located around a portion of the bead core that is oriented toward a rim flange.

The tubeless tire may further include a nylon chafer disposed to contact an outer surface of the steel chafer, and a second reinforcing rubber layer provided between the steel chafer and the nylon chafer in order to reduce interfacial stress.

A modulus of the first reinforcing rubber layer may be set to 350% to 450% of a modulus of a carcass-topping rubber. A height of the first reinforcing rubber layer may be equal to or lower than a height of the rim flange.

A modulus of the second reinforcing rubber layer may be set to 125% to 175% of the modulus of the carcass-topping rubber.

BRIEF DESCRIPTION OF THE DRAWINGS

The above and other objects, features and other advantages will be more clearly understood from the following detailed description taken in conjunction with the accompanying drawings, in which.

DETAILED DESCRIPTION

Figure 1:
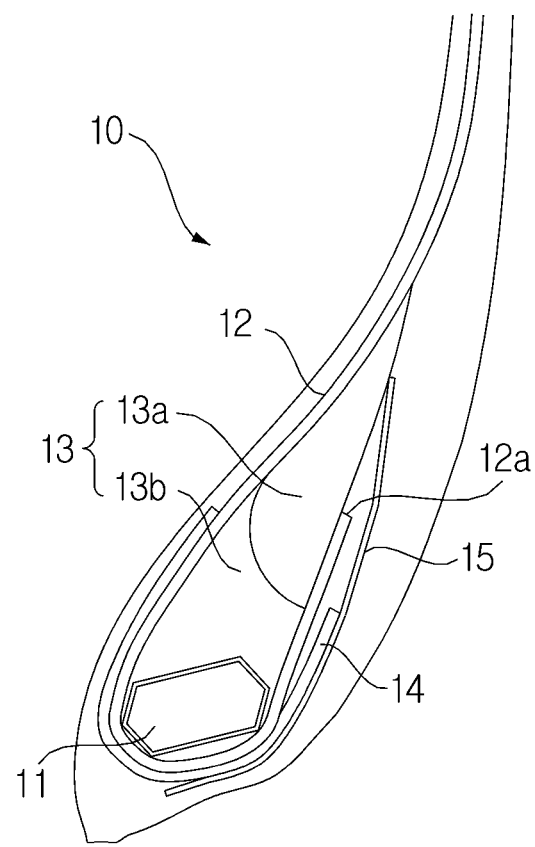
FIG. 1 is a sectional view illustrating a conventional bead portion of a tire for preventing separation of the bead portion.

Hereinafter, preferred embodiments will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter rather unclear. In the drawings, dimensions are exaggerated, omitted or schematically illustrated for description convenience and clarity.

Figure 2:
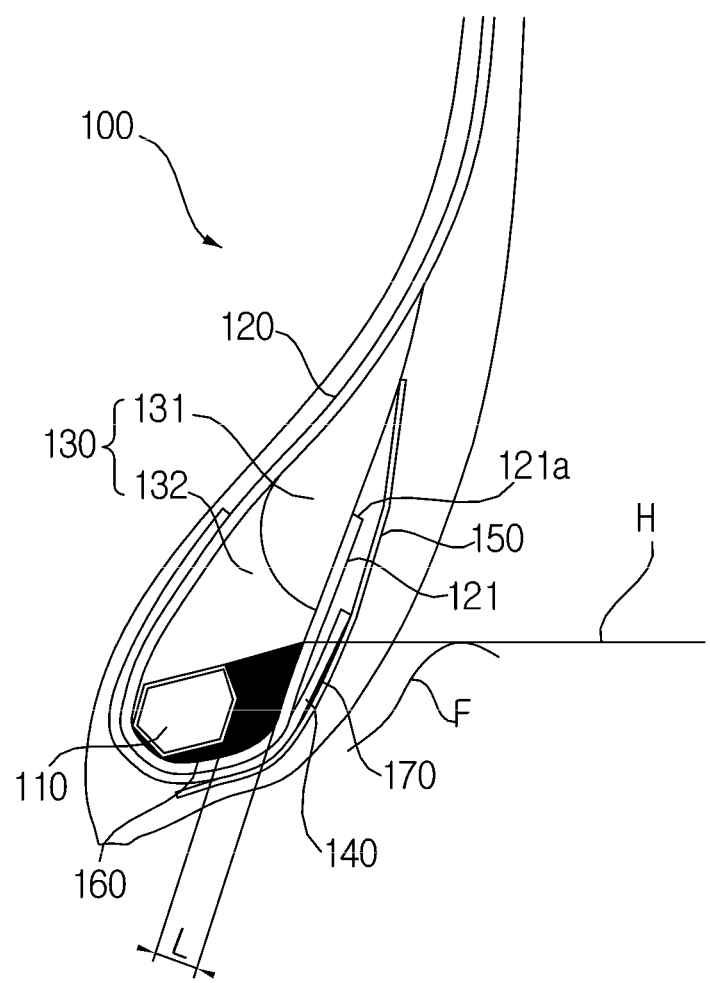
FIG. 2 is a sectional view illustrating a bead portion of a tubeless tire having a reinforced bead portion according to an embodiment.

FIG. 2 is a sectional view illustrating a bead portion of a tubeless tire having a reinforced bead portion according to an embodiment. The tubeless tire comprises a tread, which is a rubber layer configured to contact the ground, a sidewall, which is connected with the tread and defines a side surface of the tire, a bead portion, which is connected with the sidewall and is secured to a rim of a vehicle, a carcass, which is mounted inside the tire to form a frame of the tire and has high fatigue resistance to extension and contraction movement of the sidewall, and a belt, which is disposed between the tread and the carcass to protect the carcass and to increase the strength of the surface of the tread. A detailed explanation of the components of the tire, except for a bead core of the bead portion, which is mounted to an end portion of the sidewall, will be omitted.

As shown in FIG. 2, the bead portion 100 includes a bead core 110, a carcass 120, a bead filler 130, a steel chafer 140, a nylon chafer 150, a first reinforcing rubber layer 160, and a second reinforcing rubber layer 170.

The bead core 110 may be embodied as a bundle of wires having a hexagonal cross-sectional or circular cross-sectional configuration.

The carcass 120 is bent around the bead core 110 and is turned up. The carcass 120 is formed by coating rubber on a core member that is embodied as a steel cord, and is arranged in the radial direction. The carcass 120 functions as a frame of the tire together with the belt layer mounted inside the tread.

The bead filler 130 is rubber that fills an empty space (a space above the bead core), which is formed when the carcass 120 is bent around the bead core 110, and includes an upper bead filler 131 located at a relatively high position and a lower bead filler 132 located at a relatively low position.

The steel chafer 140 is in close contact with the outer surface of the carcass 120, and two opposite end portions of the steel chafer 140 are turned up toward two respective opposite end portions of the carcass 120. One end of the steel chafer 140 is located below an end 121a of a turnup portion 121 of the carcass 120.

The nylon chafer 150 is in close contact with a portion of the outer surface of the steel chafer 140 that is oriented toward the rim flange. One end of the nylon chafer 150 is turned up so as to cover the end of the steel chafer 140 and the turnup portion 121 of the carcass 120 and is located above the end 121a of the turnup portion 121 of the carcass 120. One end of the nylon chafer 150 is in contact with the right side surface of the upper bead filler 131.

The first reinforcing rubber layer 160 is provided between the bead core 110 and the turnup edge portion 121 of the carcass 120 in order to prevent the turnup portion 121 of the carcass 120 from being pulled downwards. The first reinforcing rubber layer 160 is located around a portion of the bead core 110 that is oriented toward the rim flange F. Therefore, the first reinforcing rubber layer 160 prevents the turnup portion 121 of the carcass 120 from being deformed in the direction opposite the direction in which the carcass 120 is turned up and from being pulled downwards by the increase in pressure between the bead core 110 and the rim flange F.

It is preferable that the distance between the right side surface of the bead core 110 and the inner surface of the turnup portion 121 of the carcass 120, that is, the thickness L of the first reinforcing rubber layer 160, be 2 mm to 4 mm. The height of the first reinforcing rubber layer 160 is set to be equal to or lower than the height H of the rim flange F. It is preferable that the modulus of the first reinforcing rubber layer 160 be 350% to 450% of the modulus of the carcass-topping rubber.

The second reinforcing rubber layer 170 is provided between the steel chafer 140 and the nylon chafer 150 in order to reduce interfacial stress. It is preferable that the thickness of the second reinforcing rubber layer 170 be 3 mm or less. It is preferable that the modulus of the second reinforcing rubber layer 170 be 125% to 175% of the modulus of the carcass-topping rubber.

As the modulus of the first reinforcing rubber layer 160 is increased, the strain energy of the edge portion of the carcass is decreased and the strain energy between the steel chafer 140 and the nylon chafer 150 is increased, which increases the possibility of separation of the steel chafer 140 and the nylon chafer 150 from each other. Accordingly, the structural modification and appropriate distribution of the strength (i.e. distribution of the modulus of the first reinforcing rubber layer and the modulus of the second reinforcing rubber layer) according to the presently described embodiments are needed.

Figure 3:
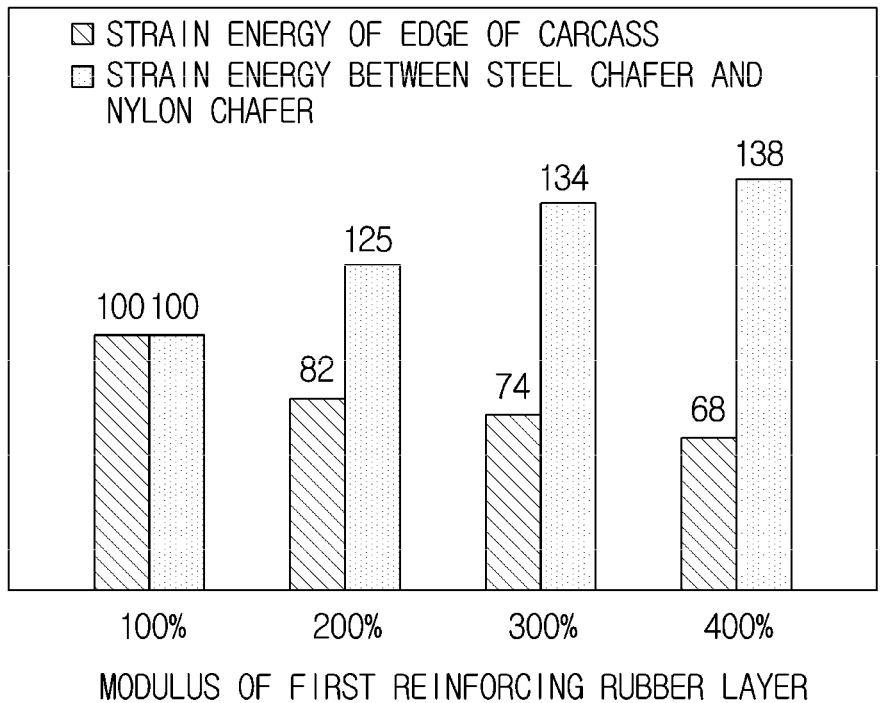
FIG. 3 is a graph illustrating strain energy depending on the modulus of a reinforcing rubber layer in the embodiment.

FIG. 3 is a graph illustrating the strain energy depending on the modulus of the first reinforcing rubber layer 160 in the embodiment. The graph in FIG. 3 shows the strain energy of the edge portion of the carcass (the end of the turnup portion) and the strain energy between the steel chafer and the nylon chafer when the modulus of the first reinforcing rubber layer 160 is respectively set to 100%, 200%, 300% and 400% of the modulus of the carcass-topping rubber. When the modulus of the first reinforcing rubber layer 160 is set to 100% of the modulus of the carcass-topping rubber, the value of the strain energy is set to 100. The value of the strain energy varies depending on the change in modulus of the first reinforcing rubber layer 160. As shown in the graph, the strain energy of the edge portion of the carcass is gradually decreased (100→82→74→68), and the strain energy between the steel chafer and the nylon chafer is gradually increased (100→125→134→138).

Figure 4:
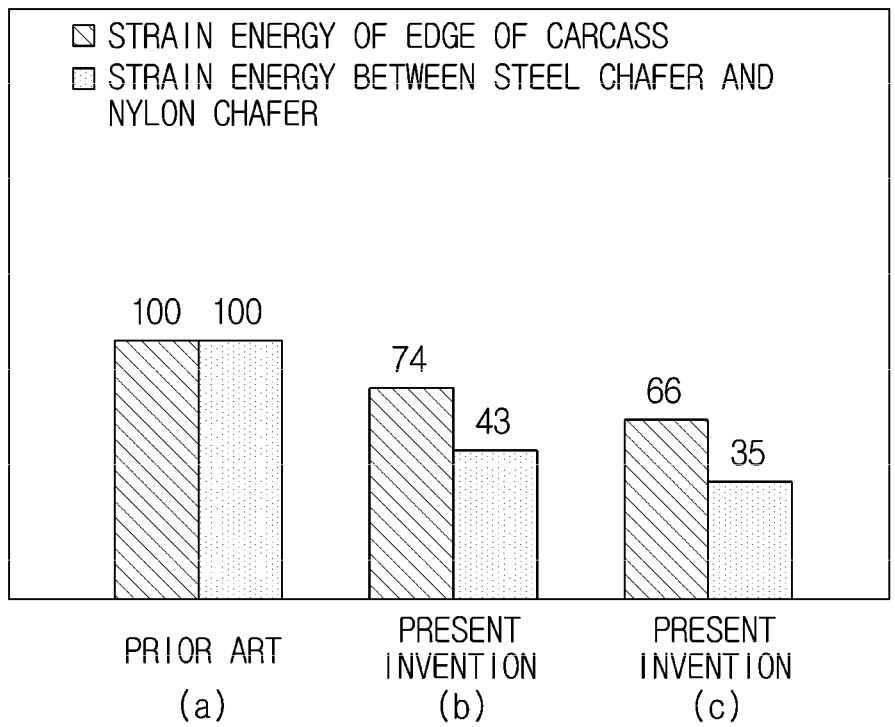
FIG. 4 is a graph illustrating a comparison of strain energy of the bead portion according to the embodiment and strain energy of the conventional bead portion.

FIG. 4 is a graph illustrating a comparison of the strain energy of the bead portion according to the embodiment and the strain energy of the conventional bead portion, in which the value of the strain energy in the conventional structure (a) is set to 100. As shown in the graph, when the conventional structure (a) (refer to FIG. 1) is modified into the structure (b) (refer to FIG. 2), the strain energy of the edge portion of the carcass is decreased by about 25%, and the strain energy between the steel chafer and the nylon chafer is decreased by about 55%.

When the conventional structure (a) is modified into the structure (c) (i.e. when the properties and structure are optimized such that the modulus of the first reinforcing rubber layer is set to 400% of the modulus of the carcass-topping rubber and the modulus of the second reinforcing rubber layer is set to 150% of the modulus of the carcass-topping rubber), the strain energy of the edge portion of the carcass is decreased by about 35%, and the strain energy between the steel chafer and the nylon chafer is decreased by about 65%.

As is apparent from the above description, the disclosed embodiments provide a tubeless tire having a reinforced bead portion, which reinforces the bead portion and improves the durability of the bead portion under a high-pneumatic-pressure condition by reducing the stress applied to interfaces of the edge portion of the carcass, the steel chafer and the nylon chafer.

Although the preferred embodiments have been disclosed, those skilled in the art will appreciate that various modifications, additions and substitutions are possible, without departing from the scope and spirit of the disclosure as recited in the accompanying claims.

What is claimed is:

1. A tubeless tire having a reinforced bead portion having a carcass turned up around a bead core, a bead filler filled in a space above the bead core surrounded by the carcass, the bead filler including an upper bead filler located at a relatively high position in the tire radial direction and a lower bead filler located at a relatively low position in the tire radial direction, and a steel chafer disposed to contact an outer surface of the carcass, the tubeless tire comprising:

a first reinforcing rubber layer provided beneath the lower bead filler, and between the bead core and a turnup portion of the carcass in order to prevent the turnup portion of the carcass from being pulled downwards, the first reinforcing rubber layer being located around a portion of the bead core that is oriented toward a rim flange;

a nylon chafer disposed to contact an outer surface of the steel chafer; and a second reinforcing rubber layer provided between the steel chafer and the nylon chafer in order to reduce interfacial stress, an upper end of the second reinforcing layer and an upper end of the steel chafer are disposed at the same height in the tire radial direction, wherein a Young's modulus of the first reinforcing rubber layer is set to 350% to 450% of a Young's modulus of a carcass-topping rubber.

2. The tubeless tire according to claim 1, wherein a height of the first reinforcing rubber layer is equal to or lower than a height of the rim flange.

3. The tubeless tire according to claim 1, wherein a Young's modulus of the second reinforcing rubber layer is set to 125% to 175% of a Young's modulus of a carcass-topping rubber.

* * * * *